US011798532B2

United States Patent
Decrop et al.

(10) Patent No.: US 11,798,532 B2
(45) Date of Patent: Oct. 24, 2023

(54) CONTEXTUAL JUSTIFICATION FOR A VIRTUAL ASSISTANT RESPONSE

(71) Applicant: International Business Machines Corporation, Armonk, NY (US)

(72) Inventors: Clement Decrop, Arlington, VA (US); Tushar Agrawal, West Fargo, ND (US); Jeremy R. Fox, Georgetown, TX (US); Sarbajit K. Rakshit, Kolkata (IN); Raghuveer Prasad Nagar, Kota (IN); Jagadesh Ramaswamy Hulugundi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 17/340,379

(22) Filed: Jun. 7, 2021

(65) Prior Publication Data
US 2022/0392433 A1   Dec. 8, 2022

(51) Int. Cl.
| | | |
|---|---|---|
| G10L 15/00 | (2013.01) |
| G10L 15/02 | (2006.01) |
| G10L 15/22 | (2006.01) |
| G10L 15/08 | (2006.01) |
| G10L 15/18 | (2013.01) |
| G10L 15/183 | (2013.01) |

(52) U.S. Cl.
CPC .............. *G10L 15/02* (2013.01); *G10L 15/22* (2013.01); *G10L 15/08* (2013.01); *G10L 15/183* (2013.01); *G10L 15/1822* (2013.01)

(58) Field of Classification Search
CPC ......... G10L 15/16; G10L 19/00; G10L 25/27; G10L 25/30; G10L 15/02; G10L 15/063; G10L 15/07; G10L 15/20; G10L 15/22; G10L 15/26; G10L 15/30; G10L 15/08; G10L 15/1822; G10L 15/183; G10L 15/193; G10L 15/19
See application file for complete search history.

(56) References Cited

U.S. PATENT DOCUMENTS 9,201,865 B2 *  12/2015  Tran ....................... G06F 40/30
9,430,570 B2     8/2016  Button
(Continued)

FOREIGN PATENT DOCUMENTS

CN        1679260 B      3/2011

OTHER PUBLICATIONS

Amazon Alexa, "Send the User a Progressive Response", Amazon.com, Inc., Accessed on Apr. 14, 2021, 11 Pages.
(Continued)

*Primary Examiner* — Vu B Hang
(74) *Attorney, Agent, or Firm* — Michael O'Keefe (57) ABSTRACT

In an approach to providing contextual justification for a virtual assistant response, one or more computer processors receive a first voice command from a user. One or more computer processors determine one or more boundary conditions associated with the first voice command. Based on the one or more boundary conditions, one or more computer processors determine a first response to the first voice command and a contextual justification of the first response. One or more computer processors respond to the user with the response to the first voice command and the contextual justification of the response.

20 Claims, 3 Drawing Sheets

(56) References Cited

U.S. PATENT DOCUMENTS

| | | | |
|---|---|---|---|
| 9,495,331 | B2 | 11/2016 | Govrin |
| 9,501,745 | B2 | 11/2016 | Nitz |
| 10,949,153 | B2 | 3/2021 | Viedt |
| 10,997,974 | B2 * | 5/2021 | Shin .................. G10L 15/18 |
| 11,508,361 | B2 * | 11/2022 | Madwed .............. G10L 15/22 |
| 11,568,862 | B2 * | 1/2023 | Chen .................. G10L 15/183 |
| 11,575,783 | B2 * | 2/2023 | Kim .................... G06N 3/08 |
| 2021/0081749 | A1 | 3/2021 | Claire |

OTHER PUBLICATIONS

Authors et al.: Disclosed Anonymously, "AI Assistance Interaction with Visual Simulation on Edge Device", An IP.com Prior Art Database Technical Disclosure, IP.com No. IPCOM000262813D, IP.com Electronic Publication Date: Jul. 1, 2020, 6 Pages.

Authors et al.: Disclosed Anonymously, "Ecosystem to process query parameters among multi-AI voice assistance systems", An IP.com Prior Art Database Technical Disclosure, IP.com No. IPCOM000263421D, IP.com Electronic Publication Date: Aug. 29, 2020, 5 Pages.

Authors et al.: Disclosed Anonymously, "Method and System for Client Device for AI Voice Response System", An IP.com Prior Art Database Technical Disclosure, IP.com No. IPCOM000261648D, IP.com Electronic Publication Date: Mar. 24, 2020, 5 Pages.

Authors et al.: Disclosed Anonymously, "Method and System for Utilizing an Artificial Intelligence (AI) Voice Response System to Derive Relevant Body Language and Augmented Context of a User", An IP.com Prior Art Database Technical Disclosure, IP.com No. IPCOM000258713D, IP.com Electronic Publication Date: Jun. 7, 2019, 5 Pages.

Bozkurt et al., "Artificial Intelligence in Education: Current Insights and Future Perspectives", Handbook of Research on Learning in the Age of Transhumanism, Jan. 2019, 14 Pages.

Greene, Tristan, "IBM and Unity are teaming up to bring Watson's AI to VR and AR games", The Next Web, Feb. 20, 2018, 9 Pages.

Guidotti et al., "A Survey of Methods for Explaining Black Box Models", ACM Computing Surveys, vol. 51, No. 5, Article 93, Aug. 2018, 42 Pages.

Gupta, Nishika, "A Literature Survey on Artificial Intelligence", International Journal of Engineering Research & Technology (IJERT), ISSN: 2278-0181, ICPCN—2017 Conference Proceedings, Special Issue, 2017, 5 Pages.

IBM, "Watson Assistant", IBM, Accessed on Apr. 14, 2021, 8 Pages.

Koh et al., "Understanding Black-box Predictions via Influence Functions", Proceedings of the 34th International Conference on Machine Learning, Sydney, Australia, PMLR 70, 2017, 12 Pages.

Vynz Research, "Global Voice Assistant Market is Set to Reach USD 5,843.8 million by 2024, Observing a CAGR of 27.7% during 2019-2024: VynZ Research", Globe Newswire, Jan. 28, 2020, 8 Pages.

Weitz et al., "Let me explain!: exploring the potential of virtual agents inexplainable AI interaction design", Journal on Multimodal User Interfaces, Springer, Jul. 9, 2020, 12 Pages.

\* cited by examiner

CONTEXTUAL JUSTIFICATION FOR A VIRTUAL ASSISTANT RESPONSE

BACKGROUND OF THE INVENTION

The present invention relates generally to the field of machine learning, and more particularly to providing contextual justification for a virtual assistant response.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results, and to uncover hidden insights through learning from historical relationships and trends in the data.

Virtual assistants, as known in the art, can provide procedural instructions to users. For example, a virtual assistant can provide a series of instructions to navigate to a location, follow a recipe, or fix a flat tire. Typically, a virtual assistant receives and processes commands or requests via one or more natural language processing techniques. In addition, a virtual assistant may act as a home automation hub via connection to a plurality of smart devices, often referred to as the Internet of Things (IoT).

Natural language processing (NLP) is a field of computer science, artificial intelligence, and linguistics concerned with the interactions between computers and human (natural) languages. As such, natural language processing is related to the area of human-computer interaction. Many challenges in natural language processing involve natural language understanding, that is, enabling computers to derive meaning from human or natural language input.

The Internet of Things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

SUMMARY

Embodiments of the present invention disclose a computer-implemented method, a computer program product, and a system for providing contextual justification for a virtual assistant response. The computer-implemented method may include one or more computer processors receiving a first voice command from a user. One or more computer processors determine one or more boundary conditions associated with the first voice command. Based on the one or more boundary conditions, one or more computer processors determine a first response to the first voice command and a contextual justification of the first response. One or more computer processors respond to the user with the response to the first voice command and the contextual justification of the response.

DETAILED DESCRIPTION

Virtual assistants, such as an artificial intelligence (AI) voice assistance system, are becoming popular with many users. With a virtual assistant, a user can submit a voice command and the virtual assistant replies to the voice command and/or executes one or more activities associated with the voice command. Occasionally, a response or an activity can be performed by the virtual assistant in more than one way, and different ways of performing the activity may have different advantages or may have various parameters and/or boundary conditions to consider, where a boundary condition may impose a particular constraint or preference. When submitting a voice command to a virtual assistant, a user may not know or remember each of the boundary conditions to consider along with the requested activity. Also, even if the virtual assistant considers one or more boundary conditions before making a recommendation or performing an activity, the user may not be aware of the considerations.

Embodiments of the present invention recognize that responses to commands by a virtual assistant can be improved when, after considering one or more boundary conditions of the request, the virtual assistant provides contextual justification to the user for the response or action taken. Embodiments of the present invention recognize that providing any boundary conditions or parameters not specified by the user, but considered in a response to the user, improves the user's experience with the virtual assistant and gives the user an opportunity to refine the initial request. Implementation of embodiments of the invention may take a variety of forms, and exemplary implementation details are discussed subsequently with reference to the Figures.

Figure 1:
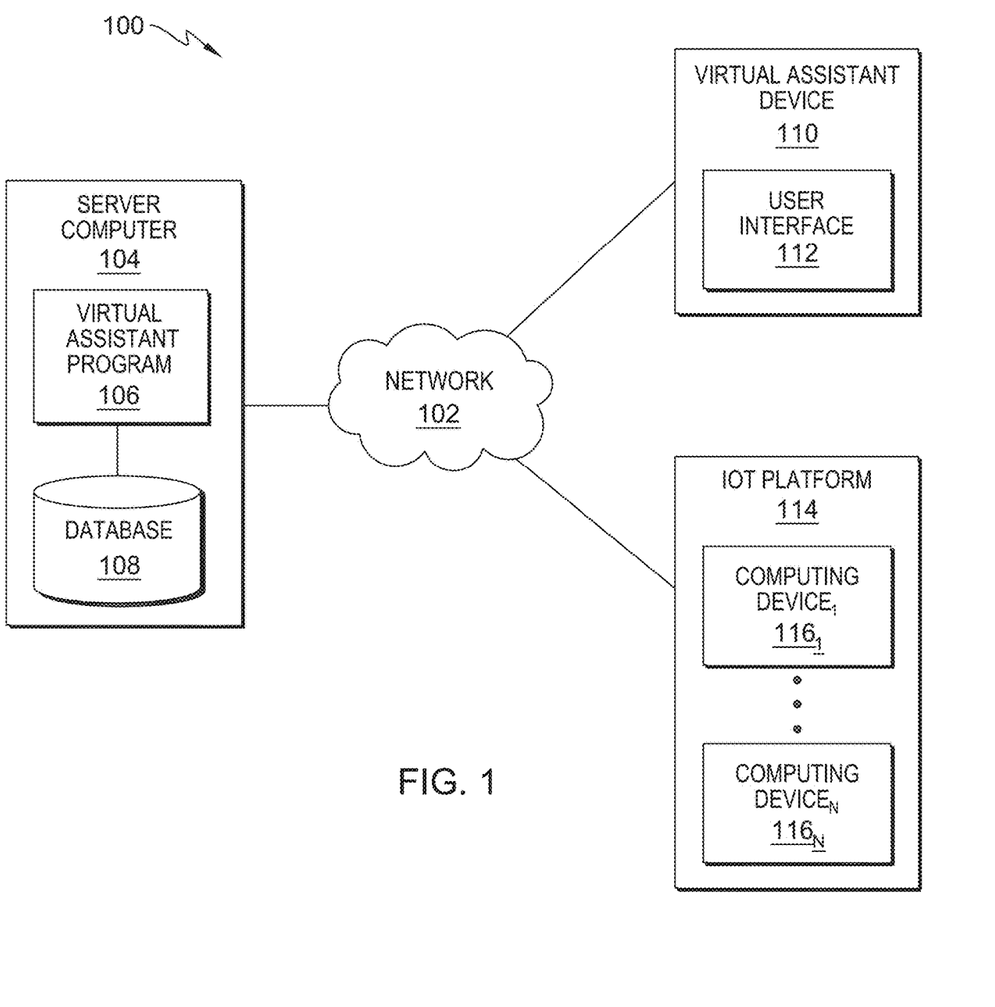
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, virtual assistant device 110, and Internet of Things (IoT) platform 114 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, virtual assistant device 110, and IoT platform 114, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with virtual assistant device 110, IoT platform 114, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes virtual assistant program 106 and database 108. Server computer 104 may include internal and external hardware components, as depicted and described in further detail with respect to FIG. 3.

Virtual assistant program 106 operates to provide a contextual justification with a recommendation, response, or activity performed in response to a voice command from a user. Virtual assistant program 106 bases the contextual justification on predicted parameters that may not have been specified by the user in the request, either because the user did not remember the parameters or thought the parameters were obvious. Virtual assistant program 106 receives a voice command and determines boundary conditions associated with the voice command. Virtual assistant program 106 determines a response to the command and a justification for the response. Virtual assistant program 106 provides a response to the command and the justification for the response. Virtual assistant program 106 receives a response from the user. Virtual assistant program 106 determines whether the received response includes an additional command or boundary condition. If, based on the received response from the user of virtual assistant device 110, virtual assistant program 106 determines that the received response includes an additional command or boundary condition, then virtual assistant program 106 determines a new response and justification to refine the response for the user. Virtual assistant program 106 stores the contextual situation in a knowledge corpus. Virtual assistant program 106 is depicted and described in further detail with respect to FIG. 2.

Database 108 stores information used and generated by virtual assistant program 106. In the depicted embodiment, database 108 resides on server computer 104. In another embodiment, database 108 may reside elsewhere within distributed data processing environment 100, provided that virtual assistant program 106 has access to database 108. A database is an organized collection of data. Database 108 can be implemented with any type of storage device capable of storing data and configuration files that can be accessed and utilized by virtual assistant program 106, such as a database server, a hard disk drive, or a flash memory. Database 108 represents one or more databases that store data received or extracted from computing device $116_{1-N}$ on IoT platform 114. Database 108 may also store one or more user preferences associated with contextual justification of issued voice commands.

In an embodiment, database 108 stores a knowledge corpus (not shown) based on previously received commands and possible justifications for responses to the previously received commands to enable virtual assistant program 106 to learn from historical scenarios and contextual needs of the user. In a learning, i.e., training, period embodiment, virtual assistant program 106 receives voice commands from one or more users of virtual assistant device 110 within an ecosystem and learns boundary conditions and/or other parameters associated with the commands. In the learning period embodiment, virtual assistant program 106 may also receive boundary conditions for the command included in the command from the user. In the embodiment, virtual assistant program 106 provides responses to the commands and possible contextual justification for the responses. In the embodiment, virtual assistant program 106 receives feedback from the users regarding priorities and/or usefulness of the justifications based on the various boundary conditions associated with a plurality of contextual situations. In the embodiment, a user may ask virtual assistant program 106 for a justification of the response to the command. During the learning period embodiment, based on the user's subsequent actions or response, virtual assistant program 106 determines whether the user accepted or ignored the justification and stores the determination in the knowledge corpus for use in response to future commands. During the learning period embodiment, virtual assistant program 106 determines for what type of contextual situation the user needs a justification. For example, the user may instruct virtual assistant program 106 that no justification is needed for music selection, however, justification is always needed for commands associated with booking restaurants.

In an embodiment, virtual assistant program 106 uses a neural network model, stored in database 108, to learn boundary conditions associated with various commands and/or activities. As would be recognized by a person of skill in the art, a trained neural network model includes one or more hidden layers. In neural networks, a hidden layer is located between the input and output of the algorithm, in which the function applies weights to the inputs and directs them through an activation function as the output. In short, the hidden layers perform nonlinear transformations of the inputs entered into the network. In the embodiment, virtual assistant program 106 stores the various contextual justifications in the knowledge corpus in association with the received commands and uses the justifications as output nodes of the neural network model during a prediction period.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Virtual assistant program 106 enables the authorized and secure processing of personal data. Virtual assistant program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Virtual assistant program 106 provides information regarding personal data and the nature (e.g., type, scope, purpose, duration, etc.) of the processing. Virtual assistant program 106 provides the user with copies of stored personal data. Virtual assistant program 106 allows the correction or completion of incorrect or incomplete personal data. Virtual assistant program 106 allows the immediate deletion of personal data.

Virtual assistant device 110 represents one or more of a plurality of devices that receive and process commands or requests from a user via one or more natural language processing (NLP) techniques. Virtual assistant device 110 can be one or more of a laptop computer, a tablet computer, a smart phone, smart watch, a smart speaker, or any programmable electronic device capable of communicating with various components and devices within distributed data processing environment 100, via network 102. Virtual assistant device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, virtual assistant device 110 may be integrated into a vehicle of the user. For example, virtual assistant device 110 may include a heads-up display in the windshield of the vehicle. In general, virtual assistant device 110 represents one or more programmable electronic devices or combination of programmable electronic devices capable of executing machine readable program instructions and communicating with other computing devices, such as computing device $116_{1-N}$, within distributed data processing environment 100 via a network, such as network 102. Virtual assistant device 110 includes an instance of user interface 112.

User interface 112 provides an interface between virtual assistant program 106 on server computer 104 and a user of virtual assistant device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of virtual assistant device 110 to interact with virtual assistant program 106 to make requests of, or issue commands to, virtual assistant device 110 and/or one or more of computing device $116_{1-N}$ and receive information, actions, and/or instructions in response. In one embodiment, a user of virtual assistant device 110 accesses user interface 112 via voice commands in natural language. In another embodiment, a user of virtual assistant device 110 accesses user interface 112 via a keyboard or touch pad for text input.

Internet of Things (IoT) platform 114 is a suite of components that enable a) deployment of applications that monitor, manage, and control connected devices and sensors; b) remote data collection from connected devices; and c) independent and secure connectivity between devices. The components may include, but are not limited to, a hardware architecture, an operating system, or a runtime library (not shown). In the depicted embodiment, IoT platform 114 includes computing device $116_{1-N}$. In another embodiment, IoT platform 114 may include a plurality of other connected sensors and computing devices.

Computing device $116_{1-N}$, hereinafter computing device(s) 116, are a plurality of smart devices that can receive and act upon commands issued by the user of virtual assistant device 110 via user interface 112. As used herein, N represents a positive integer, and accordingly the number of scenarios implemented in a given embodiment of the present invention is not limited to those depicted in FIG. 1. For example, computing device(s) 116 may include security devices, such as alarms, smoke detectors, and video doorbells. In another example, computing device(s) 116 may include a climate control system, various appliances, and electronic devices. In yet another example, computing device(s) 116 may include a fitness tracker or other biometric devices associated with the user of virtual assistant device 110.

Figure 2:
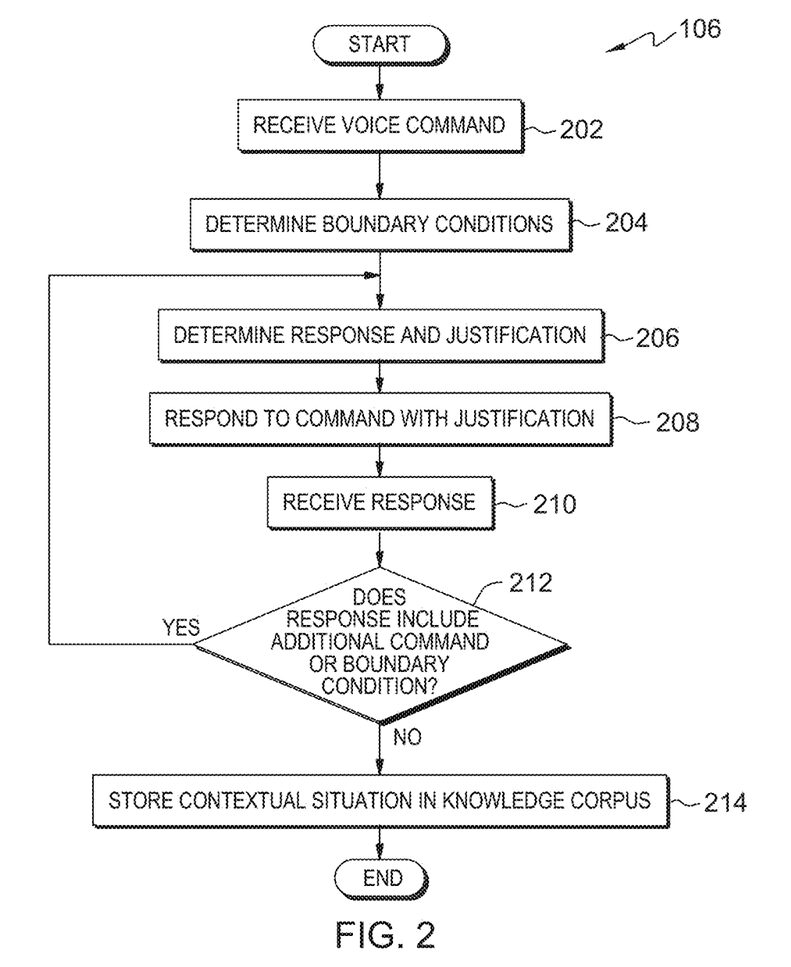
FIG. 2 is a flowchart depicting operational steps of a virtual assistant program, on a server computer within the distributed data processing environment of FIG. 1, for providing contextual justification of a command response, in accordance with an embodiment of the present invention.

FIG. 2 is a flowchart depicting operational steps of virtual assistant program 106, on server computer 104 within distributed data processing environment 100 of FIG. 1, for providing contextual justification of a command response, in accordance with an embodiment of the present invention.

Virtual assistant program 106 receives a voice command (step 202). In an embodiment, when a user of virtual assistant device 110 issues a voice command, via user interface 112, virtual assistant program 106 receives the voice command. For example, if the user states, "Book a restaurant for dinner tonight for four people," then virtual assistant program 106 receives the command to make a reservation for dinner.

Virtual assistant program 106 determines boundary conditions (step 204). As used herein, a boundary condition is an imposed constraint or preference associated with a voice command. In an embodiment, virtual assistant program 106 determines one or more boundary conditions and/or parameters associated with the received voice command. In one embodiment, virtual assistant program 106 extracts the boundary conditions from the voice command. For example, virtual assistant program 106 extracts the boundary conditions of "tonight" and "for four people" from the command "Book a restaurant for dinner tonight for four people." In a further example, the user may state, as part of the voice command, that the user has a discount coupon for Tony's Grill. In another embodiment, virtual assistant program 106 determines boundary conditions by communicating, or integrating, with one or more other data sources and/or applications associated with the user, such as the user's calendar, email, social media, etc., and extracting boundary conditions from the one or more other data sources and/or applications. In the embodiment, virtual assistant program 106 may determine one or more pending activities or tasks of the user that may imply or be associated with one or more boundary conditions. For example, virtual assistant program 106 may determine that, based on the user's calendar, the user is not available to go to dinner until after 6:00 pm tonight. In another example, virtual assistant program 106 may integrate with an order management system to determine that the user has a discount coupon for Tony's Grill. In yet another example, virtual assistant program 106 may determine, based on the user's social media feed, that the user is interested in buying a smart TV and determines, i.e., locates, a restaurant in the neighborhood of an electronics store such that the activities can be performed in parallel.

In another embodiment, virtual assistant program 106 extracts data from one or more of computing device(s) 116 to determine boundary conditions. Data may include, but is not limited to, biometric data, location data, activity data, environmental data, communication data, images, video clips, audio clips, text, documents, etc. For example, based on a feed from the user's fitness tracker, virtual assistant program 106 can determine that the user's biometric attributes indicate the user is under stress and can determine a restaurant with a calming atmosphere. In another example, based on location data provided by a global positioning system (GPS) included in computing device(s) 116, virtual assistant program 106 can determine the location of the user, and determine a restaurant within a threshold proximity to the user. In an embodiment, virtual assistant program 106 can use computing device(s) 116 to track a user's activities over time. In the embodiment, virtual assistant program 106 determines patterns in activities, such as a user typically performing activity B within a half hour of performing activity A. By learning such patterns, virtual assistant program 106 can predict boundary conditions associated with the activities. Virtual assistant program 106 stores the learned patterns in the knowledge corpus included in database 108. For example, if the user typically stops at a gas station after having dinner in a restaurant, then virtual assistant program 106 can determine a restaurant in a location where a gas station is on the user's route home.

Virtual assistant program 106 determines a response and a justification (step 206). In an embodiment, based on the determined boundary conditions, virtual assistant program 106 determines a response to the voice command and a contextual justification for the response. In an embodiment, virtual assistant program 106 queries the knowledge corpus in database 108 and retrieves the response and contextual justification that are associated with the same or similar command and/or with the same or similar boundary conditions from the knowledge corpus. The justification explains the reasoning behind the response and is based on the boundary conditions and/or parameters. Virtual assistant program 106 identifies any pending opportunities associated with the user, such as a discount coupon redemption, any pending activities, which the user could perform in conjunction, or in parallel, with the requested action, and any activity history which indicates a user preference or pattern associated with the requested action. Thus, virtual assistant program 106 augments the original command, or query, made by the user with the additional identified boundary conditions and/or parameters for a resultant query of the knowledge corpus. For example, virtual assistant program 106 determines a response to the command "Book a restaurant for dinner tonight for four people" is to make a reservation at Tony's Grill because the user has a discount coupon that will expire in two weeks. In an embodiment, virtual assistant program 106 includes additional parameters and/or boundary conditions considered for the response and justification. In an embodiment, virtual assistant program 106 executes and/or performs the determined response. For example, virtual assistant program 106 makes a dinner reservation for four people at the restaurant.

Virtual assistant program 106 responds to the command with the justification (step 208). In an embodiment, virtual assistant program 106 responds to the user with an action and/or statement and includes the contextual justification in the response. For example, virtual assistant program 106 may state, via user interface 112, "I have made a reservation for four people at Tony's Grill at 6:30 pm because you have a discount coupon for that restaurant that will expire in two weeks." In another example, virtual assistant program 106 may state, "I have made a reservation for four people at Tony's Grill at 6:30 pm because I see you are interested in buying a smart TV, and Tony's Grill is in the neighborhood of an electronics store." In an embodiment, virtual assistant program 106 responds with a voice reply. In another embodiment, virtual assistant program 106 responds with a text reply. In an embodiment, virtual assistant program 106 determines a sentiment of the user associated with the received voice command, via one or more NLP techniques, and customizes the response and/or justification based on the sentiment. For example, if virtual assistant program 106 determines the user is in a good mood, then virtual assistant program 106 may add some additional suggestions to the response or phrase the response in a jovial manner. In another example, if virtual assistant program 106 determines the user is in a hurry, then virtual assistant program 106 provides a direct response with a minimized word count to give the user a shorter experience. In an embodiment, virtual assistant program 106 determines two or more responses, each response with an associated contextual justification, and responds to the user with multiple responses and respective justifications.

Virtual assistant program 106 receives a response from the user (step 210). In an embodiment, virtual assistant program 106 receives a response from the user of virtual assistant device 110, via user interface 112, associated with the response to the user's initial voice command. For example, the user may provide feedback to the contextual justification, such as, "Oh, good idea! Thank you." In another embodiment, the user may respond with an additional command, such as "Please remind me when I am near the electronics store." In another embodiment, the user may provide one or more additional boundary conditions that virtual assistant program 106 had not considered. For example, the user may state, "One of my dinner guests requires gluten free pasta. Can Tony's Grill accommodate that?" In an embodiment where virtual assistant program 106 responds to the user with multiple responses and respective justifications, the user may respond with a preference in a new voice command.

Virtual assistant program 106 determines whether the received response includes an additional command or boundary condition (decision block 212). If, based on the received response from the user of virtual assistant device 110, virtual assistant program 106 determines that the received response includes an additional command or boundary condition ("yes" branch, decision block 212), then virtual assistant program 106 returns to step 206 to refine the response for the user. For example, virtual assistant program 106 determines whether Tony's Grill offers gluten free pasta and provides a new response to the user. In another example, virtual assistant program 106 schedules a reminder for when the user is near the electronics store.

If, based on the received response from the user of virtual assistant device 110, virtual assistant program 106 determines that the received response does not include an additional command or boundary condition ("no" branch, decision block 212), then virtual assistant program 106 stores the contextual situation in a knowledge corpus (step 214). In an embodiment, both in a learning period and in a prediction period, virtual assistant program 106 stores the contextual situation of the interaction with the user in the knowledge corpus in database 108 for continuous learning and improvement of future responses. Once commands, responses, contextual justifications, and outcomes of the interaction with the user are stored in the knowledge corpus, virtual assistant program 106 retrieves the contextual situations and extracts data from the knowledge corpus to determine applicable boundary conditions and/or parameters.

Figure 3:
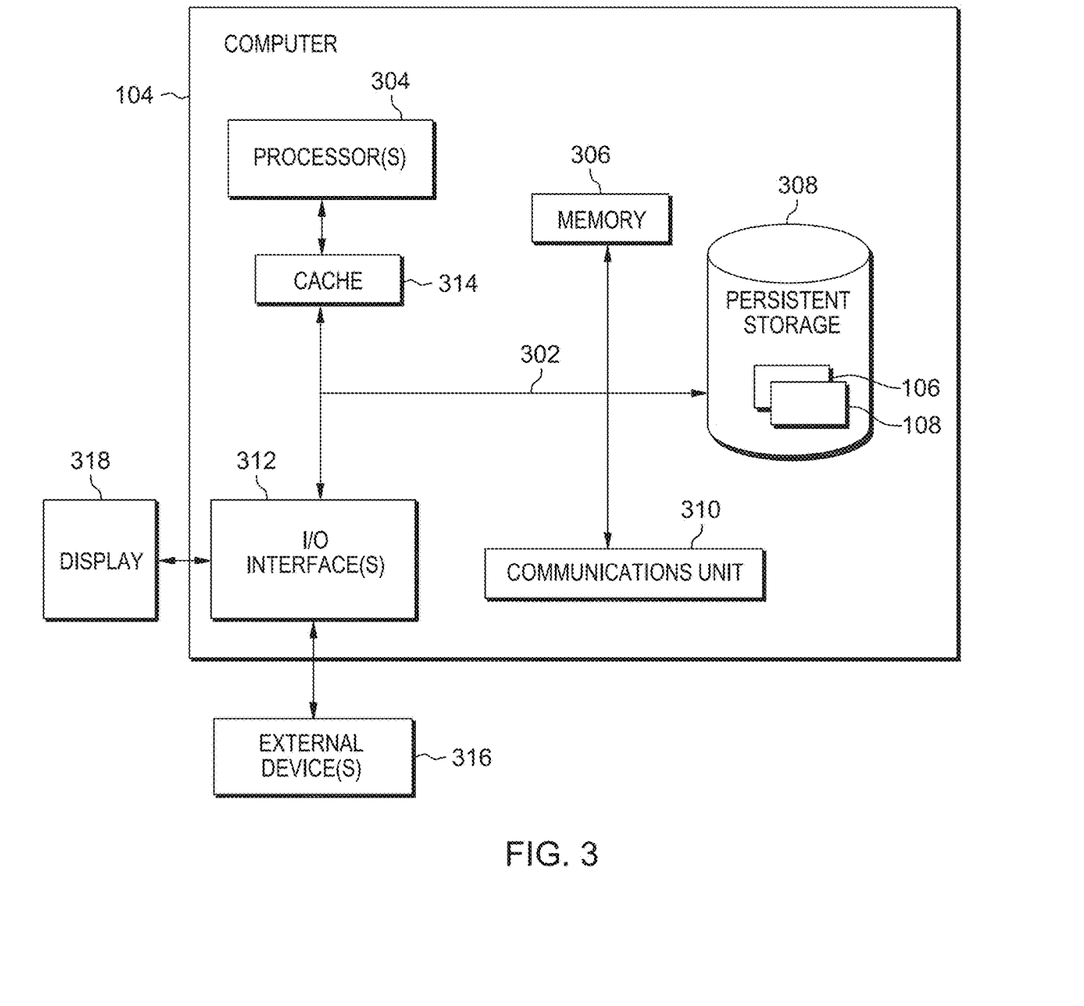
FIG. 3 depicts a block diagram of components of the server computer executing the virtual assistant program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., virtual assistant program 106 and database 108, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of virtual assistant device 110 and IoT platform 114. In these examples, communications unit 310 includes one or more network interface cards. Communications unit 310 may provide communications through the use of either or both physical and wireless communications links. Virtual assistant program 106, database 108, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., virtual assistant program 106 and database 108 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   tracking, by one or more computer processors, one or more activities associated with a user over time;
   determining, by one or more computer processors, one or more patterns in the one or more activities associated with the user;
   receiving, by one or more computer processors, a first voice command from the user;
   based on the one or more patterns, predicting, by one or more computer processors, one or more boundary conditions associated with the first voice command and the one or more activities;
   based on the one or more boundary conditions, determining, by one or more computer processors, a first response to the first voice command and a contextual justification of the first response, wherein the contextual justification is an explanation of a reasoning behind the first response; and responding, by one or more computer processors, to the user with the response to the first voice command and the contextual justification of the response.

2. The computer-implemented method of claim 1, further comprising:

receiving, by one or more computer processors, from the user, a second response associated with the first response to the voice command and the contextual justification of the first response; and determining, by one or more computer processors, the second response includes at least one of a second voice command or an additional boundary condition.

3. The computer-implemented method of claim 1, further comprising:

storing, by one or more computer processor, the first voice command, the one or more boundary conditions, the first response to the first voice command, and the contextual justification of the first response in a knowledge corpus.

4. The computer-implemented method of claim 1, wherein determining the one or more boundary conditions further comprises at least one of:

extracting, by one or more computer processors, at least one of the one or more boundary conditions from the first voice command;

communicating, by one or more computer processors, with one or more data sources associated with the user; and extracting, by one or more computer processors, data from one or more computing devices associated with the user.

5. The computer-implemented method of claim 4, wherein the one or more data sources include at least one of: a calendar application, an email application, a social media application, and a global positioning system (GPS).

6. The computer-implemented method of claim 1, wherein determining the one or more boundary conditions further comprises at least one of:

identifying, by one or more computer processors, one or more pending opportunities associated with the user;

identifying, by one or more computer processors, one or more pending activities of the user; and identifying, by one or more computer processors, an activity history which indicates a preference of the user.

7. The computer-implemented method of claim 1, further comprising:

determining, by one or more computer processors, a sentiment of the user associated with the first voice command, wherein determining the sentiment of the user is accomplished using one or more natural language processing (NLP) techniques; and customizing, by one or more computer processors, the first response to the first voice command and the contextual justification of the first response based on the sentiment.

8. A computer program product comprising:

one or more computer readable storage devices and program instructions collectively stored on the one or more computer readable storage devices, the stored program instructions comprising:

program instructions to track one or more activities associated with a user over time;

program instructions to determine one or more patterns in one or more activities associated with the user;

program instructions to receive a first voice command from the user;

based on the one or more patterns, program instructions to predict one or more boundary conditions associated with the first voice command and the one or more activities;

based on the one or more boundary conditions, program instructions to determine a first response to the first voice command and a contextual justification of the first response, wherein the contextual justification is an explanation of a reasoning behind the first response; and program instructions to respond to the user with the response to the first voice command and the contextual justification of the response.

9. The computer program product of claim 8, the stored program instructions further comprising:

program instructions to receive, from the user, a second response associated with the first response to the voice command and the contextual justification of the first response; and program instructions to determine the second response includes at least one of a second voice command or an additional boundary condition.

10. The computer program product of claim 8, the stored program instructions further comprising:

program instructions to store the first voice command, the one or more boundary conditions, the first response to the first voice command, and the contextual justification of the first response in a knowledge corpus.

11. The computer program product of claim 8, wherein the program instructions to determine the one or more boundary conditions comprise at least one of:

program instructions to extract at least one of the one or more boundary conditions from the first voice command;

program instructions to communicate with one or more data sources associated with the user; and program instructions to extract data from one or more computing devices associated with the user.

12. The computer program product of claim 11, wherein the one or more data sources include at least one of: a calendar application, an email application, a social media application, and a global positioning system (GPS).

13. The computer program product of claim 8, wherein the program instructions to determine the one or more boundary conditions comprise at least one of:

program instructions to identify one or more pending opportunities associated with the user;

program instructions to identify one or more pending activities of the user; and program instructions to identify an activity history which indicates a preference of the user.

14. The computer program product of claim 8, the stored program instructions further comprising:

program instructions to determine a sentiment of the user associated with the first voice command, wherein determining the sentiment of the user is accomplished using one or more natural language processing (NLP) techniques; and program instructions to customize the first response to the first voice command and the contextual justification of the first response based on the sentiment.

15. A computer system comprising:
one or more computer processors;
one or more computer readable storage media;

program instructions collectively stored on the one or more computer readable storage media for execution by at least one of the one or more computer processors, the stored program instructions comprising:

program instructions to track one or more activities associated with a user over time;

program instructions to determine one or more patterns in one or more activities associated with the user;

program instructions to receive a first voice command from the user;

based on the one or more patterns, program instructions to predict one or more boundary conditions associated with the first voice command and the one or more activities;

based on the one or more boundary conditions, program instructions to determine a first response to the first voice command and a contextual justification of the first response, wherein the contextual justification is an explanation of a reasoning behind the first response; and program instructions to respond to the user with the response to the first voice command and the contextual justification of the response.

16. The computer system of claim 15, the stored program instructions further comprising:

program instructions to receive, from the user, a second response associated with the first response to the voice command and the contextual justification of the first response; and program instructions to determine the second response includes at least one of a second voice command or an additional boundary condition.

17. The computer system of claim 15, the stored program instructions further comprising:

program instructions to store the first voice command, the one or more boundary conditions, the first response to the first voice command, and the contextual justification of the first response in a knowledge corpus.

18. The computer system of claim 15, wherein the program instructions to determine the one or more boundary conditions comprise at least one of:

program instructions to extract at least one of the one or more boundary conditions from the first voice command;

program instructions to communicate with one or more data sources associated with the user; and program instructions to extract data from one or more computing devices associated with the user.

19. The computer system of claim 15, wherein the program instructions to determine the one or more boundary conditions comprise at least one of:

program instructions to identify one or more pending opportunities associated with the user;

program instructions to identify one or more pending activities of the user; and program instructions to identify an activity history which indicates a preference of the user.

20. The computer system of claim 15, the stored program instructions further comprising:

program instructions to determine a sentiment of the user associated with the first voice command, wherein determining the sentiment of the user is accomplished using one or more natural language processing (NLP) techniques; and program instructions to customize the first response to the first voice command and the contextual justification of the first response based on the sentiment.

* * * * *